July 16, 1940.     A. CARLSON     2,208,495
VEHICLE
Filed June 29, 1938     2 Sheets-Sheet 1
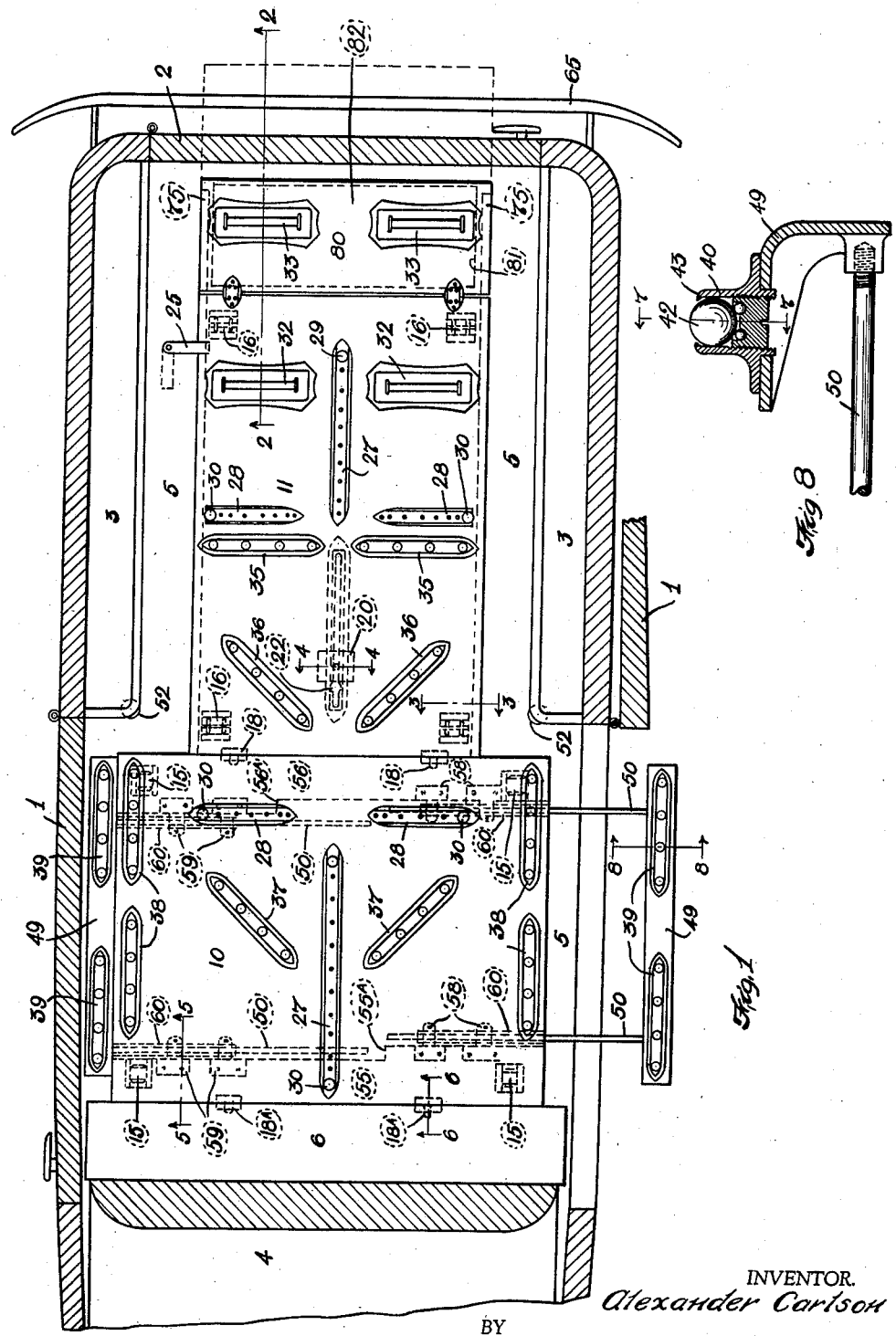
INVENTOR.
Alexander Carlson
BY
Ray, Oberlin & Ray
ATTORNEYS.

July 16, 1940.　　　A. CARLSON　　　2,208,495
VEHICLE
Filed June 29, 1938　　　2 Sheets-Sheet 2
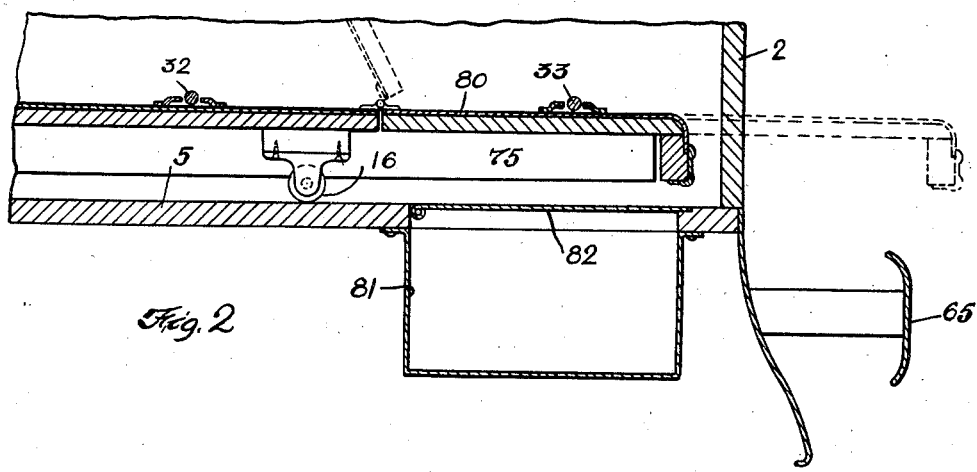
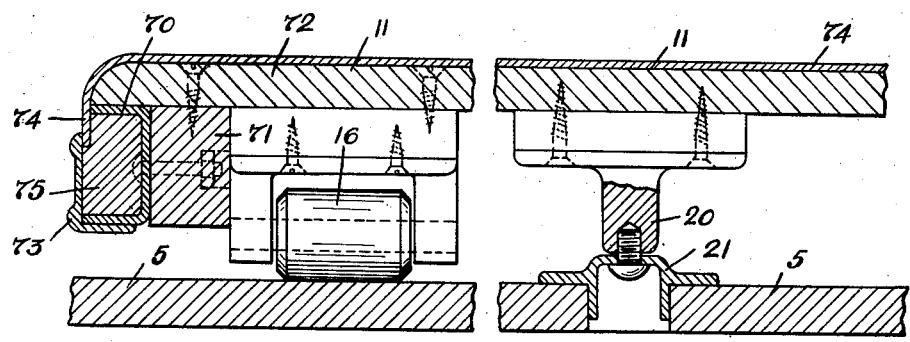
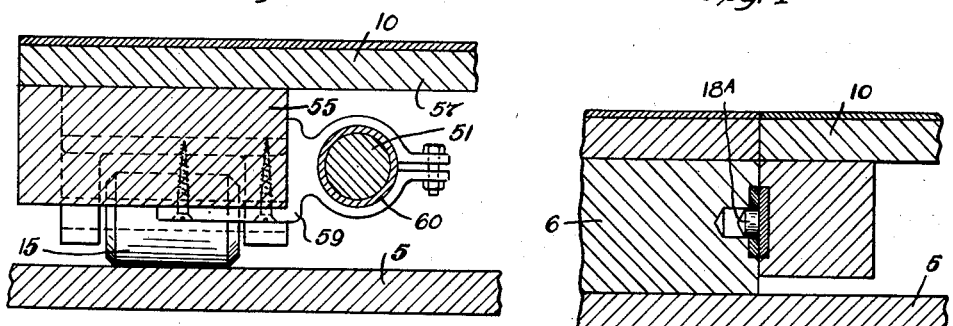
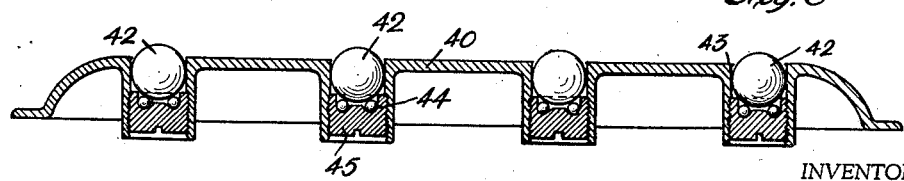
INVENTOR.
Alexander Carlson
BY
Ray, Oberlin & Ray
ATTORNEYS.

Patented July 16, 1940

2,208,495

UNITED STATES PATENT OFFICE 2,208,495

VEHICLE

Alexander Carlson, Detroit, Mich., assignor to The Bender Body Company, Cleveland, Ohio, a corporation of Ohio Application June 29, 1938, Serial No. 216,430

3 Claims. (Cl. 296—16)

This invention relates to a convertible vehicle body adapted specifically to be used either as a hearse or as an ambulance, when used as a hearse to be adapted for loading either at the side or at the rear and including features particularly facilitating the handling of a casket when loading or unloading at either position; when used as an ambulance to increase the head room over that available when used as a hearse. With respect to loading and unloading, one object is to furnish overhangs which can be brought out beyond the end or side of the car body, and beyond any bumpers, running boards, or the like, so that the casket, or other weight to be moved into or out of the car requires only vertical movement after it comes off the overhand; that is, the handlers do not have to swing it out over a bumper or over a running board.

Another object is to avoid having any sliding movement in any direction which is not upon rolling supports; thus no cylindrical rollers are used in positions where the movement over them will have any axial component.

Although shown and described particularly in its adaptation to the specific purposes indicated, such disclosure is intended to be by way of example and not by way of limitation. The invention is adaptable to other purposes, particularly in connection with handling heavy objects into or out of a vehicle.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:

Fig. 1 is a floor plan of a hearse, showing my improvements applied thereto;

Fig. 2 is a partial vertical central section on a larger scale, taken on the plane 2—2 of Fig. 1;

Figs. 3, 4, 5, 6, 7 and 8 are enlarged vertical sections each with certain features in elevation, taken on the planes 3—3, 4—4, 5—5, 6—6, 7—7 and 8—8 respectively of Fig. 1. Of these Fig. 3 shows a rear platform roller and edge detail, Fig. 4 shows a sliding fastener for the rear platform, Fig. 5 shows a roller detail and a side bracket rod detail of the front platform, Fig. 6 shows a platform fastening dowel, Fig. 7 is a vertical longitudinal section through a bearing bar, and Fig. 8 is a transverse section through the side bracket and through a bearing bar thereon.

As best seen in Fig. 1, the vehicle body is of conventional type, with side doors 1, 1, rear door 2, the usual side lockers 3, and driver's seat 4. To use it as a hearse a false floor composed of two platforms is inserted on the permanent floor; the false floor is removed when it is to be used as an ambulance. The permanent floor 5 is flat except for a slightly elevated cross piece 6 immediately behind the driver's seat, which preferably comes to a height equal to that of the inserted platforms and is used as a spacer and fastening connection for the forward platform.

Throughout the description such terms as "front," "rear," "right," "left" and so on are used with respect to the vehicle body.

When the vehicle is used as a hearse, a transverse front platform 10 and a longitudinal rear platform 11 are run in on the floor 5 in any convenient way, as by rollers 15 and 16, and are fastened together and to the cross piece 6 by suitable means such as dowels 18. The front platform 10 is put in and taken out through a side door, and the back platform 11 through the rear door. The front platform is provided with means for holding down the front against uptilting tendencies, the specific mechanism shown being the bottom-headed stud 20, Figs. 1 and 4, riding in a guideway 21 into which it is inserted and from which it is removed through an opening 22. The platform 11 is additionally positioned and held against undesired movement by a clamp or clamps 25, overhanging fingers swingably attached to the floor 5, and movable up and down, or other suitable means.

Both platforms are provided with the usual longitudinal and transverse retaining plates 27, 27 and 28, 28 apertured at intervals for the reception of bier pins 29 or 30. The platforms also carry a series of anti-friction casket supports of such a nature and so grouped as best to facilitate the insertion or removal of a casket at either side or back of the vehicle, and in particular to furnish complete rolling support for every direction of movement of the casket. The rearmost of these rollers, 32, 32 and 33, 33, may be the standard cylindrical hearse roller, disposed transversely to the vehicle. The movement of the casket never has a sideward component so long as any part of its weight is supported on these rollers, for which reason conventional rollers are satisfactory in the positions indicated.

The other anti-friction bearings, hereafter called ball bars, are designated by reference characters 35 to 39 inclusive and are preferably all alike, consisting of an inverted channel 40, rounded at sides and ends, and with floor-engaging flanges 41, having a plurality of top apertures therein through each of which a large ball 42 projects. Each top aperture is slightly flanged as at 43 to less than the diameter of 42. Each ball 42 is supported from below by a series of small balls 44 in a race in the upper end of a screw plug 45.

As seen in Fig. 1, the preferred arrangement of ball bars on the platforms is that the bars 35, 35 are transverse to the vehicle and somewhat forward of the middle of the platform 11; bars 36, 36 are diagonally arranged across the forward corners of the platform 11, converging towards the front; bars 37, 37, about the middle of the front platform 10 are approximately parallel to 36, 36. Bars 38, 38 are set along each side edge of the platform 10, while bars 39, 39 are on movable brackets 49 which can be brought either close up against the side edges of platform 10, as shown on the right side, or moved out therefrom on stout rods 50 to a position several inches beyond the vehicle side, as shown on the left side. In addition to the various roller devices on the platforms 10 and 11, the usual vertical rollers 52 are applied to the inner corners of the lockers 3.

It is much easier to handle a heavy load if no swinging movement is required while it is being lifted or lowered. To avoid the need for any such swinging movement in side loading or unloading, either bracket 49 can be pulled out to give a firm support extended beyond the vehicle. A limited rearward movement of the platform portion 11 to the dotted line positions shown in Figs. 1 and 2 gives the same facility for rear loading.

This side extension of brackets 49 is provided for by mechanical arrangements which are connected with the framing of the front platform 10 and are shown principally in dotted lines in Fig. 1 and in certain details in Fig. 5.

The platform 10 has a heavy front beam 55 and rear beam 56, direct supports of the upper floor boards 57. Stout bracket clamps 58, 59, are strongly fastened to the inner edges of these side beams. These clamps hold heavy tubes 60 through which the rods 50 slide with a fairly close fit. The tubes, as shown in Fig. 1, extend to but not beyond the edges of the platform 10, and thus, while affording substantial lateral support for the rods 50, permit the brackets 49 to be moved inward against the edges of 10, thus giving space for closing of the side doors 1. When either side door is to be opened, the corresponding bracket 49 is pulled out to the limit of its travel, which is several inches beyond the edge of the vehicle body, as shown at the left hand door of Fig. 1. Suitable stops (not shown) limit the outer travel of rods 50, and if desired, spring detents or similar arrangements may be used to hold the rods in either their extended or inner positions, although these are not usually necessary and are not shown in the drawing. Inasmuch as the rods 50, 51 need to be longer than half the width of the platform 10, the beams 55 and 56 are oppositely offset by shoulders 55A and 56A, so that when both sets of rods are pushed in they pass one another.

In order to furnish a corresponding extension for rear loading or unloading, the platform section 11 can be moved back on its rollers 16, its rear travel being limited by the headed pin 20 in the guide channel 21, the extent of travel being sufficient to bring the rear end of 10 out beyond any obstructions, as shown in dotted lines in Figs. 1 and 2. It is of course apparent that the rear door 2 will be opened prior to this movement. The headed pin 20 in the slot 21 also prevents upward tilting of the platform 11 when the weight of the casket is on the extended rear end.

The platform 11, in its preferred form, is built with substantial stringers along each side, and made up of steel channels 70 backed by wooden pieces 71 to which the floor boards 72 are fastened. An ornamental beading 73, which can also hold down the edges of a carpet 74, is fastened to a filler 75.

The rear portion of the platform 11 comprises an apron 80, not directly fastened to the channels 70, hinged at its forward edge to the platform flooring and capable of being swung up and forward, thus leaving the channels 70 protruding rearward with a clear space between them. Beneath the permanent flooring 5 of the vehicle there is a suspended compartment 81, to which access is had by a lid 82 in the floor 5. By first raising the apron 80 and then raising the lid 82, various accessories may be put into or removed from the compartment 81. Specifically the compartment 81 is intended to take a "church truck", which is the folding under-carriage used for moving a casket along the aisle of a church. In the ordinary funeral car where no specific arrangements are made for the disposition of the folded church truck, it is an awkward object which is generally put in the hearse alongside the casket and impairs the dignified appearance of the loaded hearse.

The operation of the apparatus is as follows. If a casket is to be loaded from the rear, the rear door 2 is opened, the platform 11 is run to its full rearward extension and fastened by the friction clamp 25 to prevent forward movement. Since the platform now extends beyond the bumper 65, the pall bearers have only a straight lift to get the casket onto the platform 11 and do not have to swing it forward over the bumper as would otherwise be the case. The front end of the casket being deposited on the rollers 33, it is now pushed forward in a straight movement over the rollers 33, 32, and the ball bars 35, 36 and 37 to its proper position and there held by the bier pins 30 which are placed in the retaining plates 27, 28 according to the size of the casket. Soon after the forward movement of the casket is started, the clamp 25 may be loosened, allowing the platform 11 to move forward on its own rollers 16, travelling to its forward position with the casket, and is there engaged with the front platform by the dowels 18. To prevent further movement the clamp 25 is fastened.

On arriving at the destination the rear door is opened, the clamp 25 loosened, and the platform 11 is either pulled out to its rearmost extension immediately, or is allowed to ride out with the casket, until stopped by the pin 20 in slot 21. As in loading, the rearward extension of the platform beyond the bumper 65 permits the pall bearers to lower the casket directly from the platform instead of having also to move it longitudinally to clear the rear of the hearse and the bumper.

In rear loading and unloading the roller bars 35, 36, 37 do not offer an advantage over straight rollers such as 32 and 33, because there is no turning or sideward component to the casket movement, and to this extent the use of a rearwardly extendable false floor is independent of other features of the invention.

For side loading or unloading, the platform 11 is kept in its forward position and the dowels 18 and 18A lock the forward platform 10 in place. The appropriate side door being opened, the bar 49 is pulled out to the full extent of the rods 50 and the casket is directly lifted and put upon the ball bars 49, without having to be lifted inward over any part of the vehicle body. When on these ball bars it is pushed in at an angle and rides upon the ball bars 38, 37 and 36 successively, being given both a longitudinal and a turning movement. Inasmuch as it is everywhere supported entirely on a series of balls, there is no resistance to movement in any direction. The rollers 52 simply aid in guiding and preventing injury to the interior finish of the hearse. As the casket is moved further in it obviously clears the outer roller bars 49 and its entering end rides upon the ball bars 35. By this time it is nearing a position of direct axial alignment with the hearse body, and is completely so aligned before its entering end contacts the rollers 32. As usual it is fastened by bier pins. The extension bar 49 is now pushed to its inner position, the doors closed and the hearse is ready for movement. On arriving at the destination, the reverse operation takes place.

It will be observed that unless the casket is of extraordinary length, it does not overlap the apron 30. Thus the church truck can be taken out and set up before the casket is removed. It is not necessary to open the rear door fully to get the church truck in and out, and thus the church truck is always available even if the hearse is alongside a crowded curve or in some similar situation where rear loading of the casket is impossible.

For use of the vehicle as an ambulance, both platforms are simply taken out, 11 through the rear door and 10 through the side door, and the available height within the vehicle is now increased by the amount of nearly a foot, to the extent of the total platform thickness from the top of the anti-friction devices to the bottom of the rollers 16. Since obviously less head room is needed for a casket than for a patient and attendant, the increase in head room gives a substantial advantage. It has previously been proposed to make a vehicle available for use either as a hearse or as an ambulance by putting in a platform over the casket-supporting rollers of the hearse, but this of course lessens the head room available.

With my improved invention the hearse is equally available for use as a side loader or as a rear loader, the question of extension anti-friction devices for the casket beyond the limits of the vehicle is taken care of, the turning movements necessary to side loading are taken entirely upon balls instead of upon cylindrical rollers, thus avoiding the binding effect of sideward movements upon cylindrical rollers, and the disposal of church trucks and similar objects out of sight but immediately accessible is accomplished. Although the expected and most apparent use of my device is for a hearse, it is obvious that the principles of the invention are equally applicable to other vehicles into and out of which large heavy objects must be handled. It is also apparent that certain of the features, particularly the extension arrangements, are available separately either for an exclusively rear loading vehicle or for an exclusively side loading vehicle.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a funeral vehicle, a body, side and rear doors therefor, a removable floor for insertion upon the permanent floor of the vehicle body, said floor being composed of two separable parts arranged in T formation with the head of the T insertable through either of said side doors and the stem of the T insertable through the end door of the body, revoluble weight supporting means on the upper surface of said removable floor, extension devices including revoluble weight supporting rollers carried by the outer ends of the part forming the head of the T, and mechanism for supporting said extensions either within the limits of the body sides or projecting therebeyond.

2. In a funeral car body, forward side doors and an end door therefor, a two-piece platform insertable onto the permanent floor thereof, said platform comprising a T-shaped separable assembly of which the head of the T is movable transversely only of the car body and the stem of the T is movable longitudinally only thereof, the stem of the T comprising a platform having side rails extending its full length, a pivoted apron hinged at the outer end thereof which can be either closed upon the side rails or opened exposing a space between the side rails and beneath said apron.

3. A removable floor for a funeral vehicle body comprising, in combination, two sections arranged at right angles to each other and lying in the same plane, individual means for locking said sections together and to the vehicle body against movement out of their plane, and means carried by both ends of one of said sections adapted to be extended to a position overhanging the plan boundary of the vehicle while still supported within the vehicle by said section.

ALEXANDER CARLSON.